May 28, 1963  A. G. MAKOWSKI  3,091,000
CONTAINER LINING
Filed Dec. 5, 1960

INVENTOR.
ALEXANDER GEORGE MAKOWSKI
BY Russell L. Root
George W. Reiber
ATTORNEYS

United States Patent Office 3,091,000
Patented May 28, 1963

3,091,000
CONTAINER LINING
Alexander George Makowski, Fayville, Mass., assignor to American Can Company, New York, N.Y., a corporation of New Jersey
Filed Dec. 5, 1960, Ser. No. 73,578
2 Claims. (Cl. 18—59)

This invention relates to the manufacture of containers and particularly to the provision of a lining therein.

One well-known method of lining containers requires the spraying of an internal coating followed by drying the coating to form an adherent lining layer. The manufacturing processes involved, however, have many drawbacks in that solvent vapors have to be contended with and, in some instances recovered if excessively costly, toxic or explosive. Moreover the operation of spray equipment is often erratic with large periods of down time for cleaning and repair. All-in-all lining by spray coating has proved to be rather costly and in some cases, where complete continuity and imperviousness of the lining are important, extremely difficult to perform with adequate reliability.

In order to avoid the manufacturing complications and possible lining imperfections implicit in coating procedures, it has been proposed to provide liners for containers by inserting a parison or preform of plastic material into the container, and then inflating the parison until it expands into intimate contact with the container wall. So far as I am aware, this approach has never proved to be practical, especially for containers with reduced necks or access openings. If the liner parison is inserted in its stiff unheated condition, the heat required to soften it for inflation may be deleterious to the container itself. This is especially the case if the container is of thermoplastic material such as polyethylene. In any event the time required to heat the parison within the container, blow it, and then cool it to set condition inhibits production to a point that it would not be normally commercial.

I am also aware that attempts have been made to line containers using parisons while still in heat softened condition and then inflated as illustrated by U.S. Patent 2,898,972. However, the parison must be extended somewhat to provide a closed or pinched off end for blowing, and then inserted into the restricted neck of the container. In practice the insertion of a limp slightly tacky semi-molten plastic parison into the restricted neck of a container has not proved workable.

It is an object, therefore, of the present invention to provide a process wherein a semi-molten plastic parison can, with a high degree of reliability and regularity, and with acceptable rapidity, be placed inside of a container and through the neck thereof and inflated to form a liner.

A feature of the present invention is the achievement of the foregoing object by the steps of injection molding a parison in a parison mold about a support member or core pin, removing the core pin with the parison thereon from the parison mold, using the core pin as a tool to insert the semi-molten parison into the container neck, and then introducing inflating fluid through the core pin to inflate the parison into contact with the container.

Additional objects, features and advantages will appear hereinafter as the description proceeds.

Figure 1:
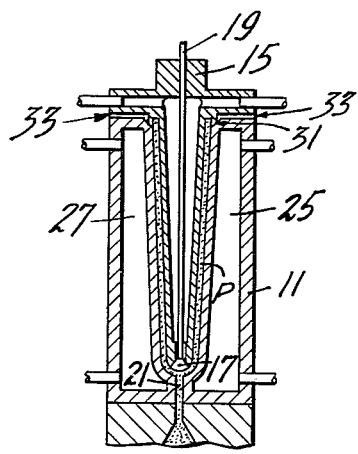
FIG. 1 is longitudinal section of a parison mold illustrating the formation of a parison therein.

Referring to the drawing, FIG. 1 illustrates the step of injection molding a parison P, and shows a parison mold 11 which may be either a one piece mold or a split mold consisting of separable halves depending upon the parison shape desired. There is disposed within the mold 11 a hollow support member or core pin 13 connected to a suitable head 15 for closing the parison mold during injection. The core pin tip has an opening which is normally closed by a valve 17 actuable by a rod 19 for a purpose which will presently appear.

With the core pin 13 in place in the mold 11 with the head 15 closing the open end thereof, heat softened plastic material is injected into the mold through a sprue passage 21 therein by an injection nozzle 23 to fill the mold space and form the parison P. The mold is kept cool, normally by passing a coolant through chambers 25 and 27 thereof so that the parison soon reaches a temperature low enough to prevent flow of the material but still high enough to be readily inflated, at which point the core pin 13 together with head 15, and the parison P can be withdrawn from the mold 11 as an assembly A, illustrated in FIG. 2.

Figure 2:
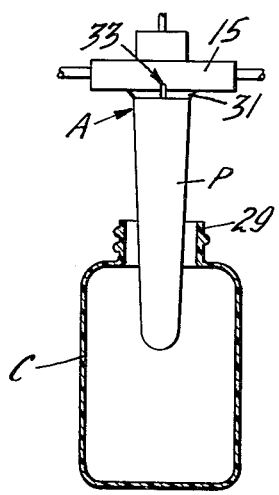
FIG. 2 is an elevation, partly in section showing the insertion of the parison within a container.

The assembly A is then inserted into the neck 29 of a container C as shown in FIG. 2. The container C may be of any material which requires a lining, but in the form shown is indicated as being of plastic. By making the container of one plastic material and the lining of another it is possible to provide a container having decreased permeability to a variety of products, and hence one of much more extensive utility. By having the core pin 13 as a stiffener for the parison P, the latter is held straight and true and is readily inserted in the neck 29 without difficulty.

As the assembly A is bottomed in the container C, the head 15 seats against the upper surface of the neck 29. The rod 19 is then actuated to open valve 17 and fluid under pressure is admitted into the parison P until it is inflated into intimate contact with the container C, taking the form shown at P' in FIG. 3. The pressure is maintained until the liner P' has cooled sufficiently to set and remain in its inflated condition.

Preferably the head 15 has a central conical surface 31 which not only fits a matching surface on the parison mold 11 during parison injection, but also helps to center the assembly A in the container C during placement and inflation. In order to permit proper inflation of the parison it is necessary to provide an escape route for the air between the parison and the container. This has previously been done in some instances by providing leakage paths through the seams of a sheet metal outer container, or by providing minute perforations in the outer container. I prefer, however, to preserve the integrity of the outer container, especially when made of plastic, and to this end the head 15 is provided with vent grooves 33 which connect the space between the parison and the container with the atmosphere until the parison P is fully inflated.

Figure 3:
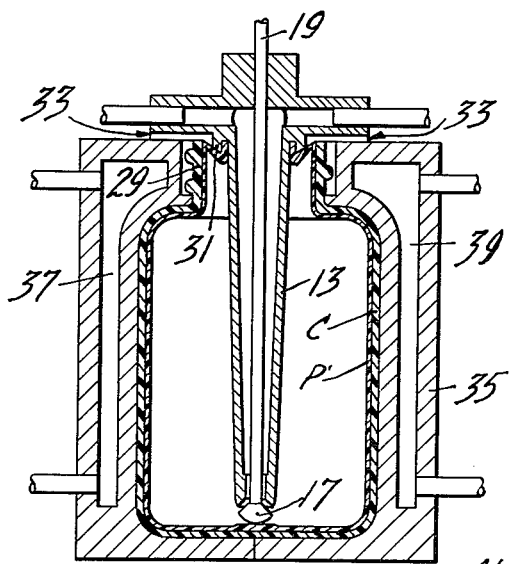
FIG. 3 is a longitudinal section to a larger scale illustrating the inflation of the parison inside of the container and also within an optional supporting form which may be used to support the container during the inflation of the parison.

If the container C is flexible or for other reasons requires support against the inflation pressure, it may be enclosed in a supporting housing 35 preferably made up of separable sections as indicated in FIG. 3. The housing 35 may also be used as a cooling agency and coolant may be passed through the chambers 37 and 39 therein to assist the setting of the parison when inflated. The cooling action of the housing 35 on the inflated parison P' may, however, be impaired somewhat if the container C is of plastic or other heat insulating material, and in that case I prefer to cool the inflated parison by refrigerating the container C before the parison is inserted, or by inflating the parison with a refrigerated fluid, or both.

Figure 4:
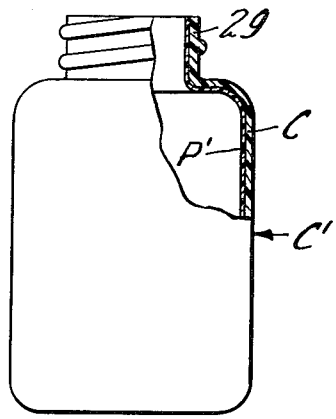
FIG. 4 is a view partly in elevation and partly in section illustrating the completed container with lining in place.

After the inflated parison has set, the core pin 13 and head 15 are removed. Either removed with them by breaking away from the inflated parison P', or trimmed therefrom in a separate operation, are the remaining unused parts of the parison, if any. This results in a lined container C' as shown in finished form in FIG. 4.

While an arrangement has been shown in which the parison has a slight clearance for insertion in the container neck and also for venting access to the space between the parison and container, it will be understood that the present invention makes it possible to arrange for a relatively snug fit between the parison neck portion and the container neck if desired, assuming that other venting arrangements are made, and that in spite of such snug fit, the core pin 13 makes it possible to insert the semi-molten parison P swiftly and accurately into the container for expeditious commercial manufacture.

It is thought that the invention and many of its attendant advantages will be understood from the foregoing description and it will be apparent that various changes may be made in the steps of the method described and their order of accomplishment without departing from the spirit and scope of the invention or sacrificing all of its material advantages, the method hereinbefore described being merely a preferred embodiment thereof.

I claim:

1. A method of internally lining a preformed container, which includes the steps of introducing a parison forming assembly, comprised of an axially passaged core pin having valve means at one end thereof and a head section at the opposite end formed with an annular flange on the underside thereof surrounding said core pin, into an injection mold cavity provided with an annular seating surface receiving said annular flange whereby said core pin is accurately centered with respect to said mold cavity, molding a thermoplastic parison about said core pin while said valve means is closed and said pin is so centered, controlling the temperature of said parison to maintain the same in semi-molten condition, introducing said core pin and semi-molten parison thereon through the neck of a container until the closed valve means is in contact and steadying relation with respect to the bottom wall of said container and said annular flange on said head section is centered in coaxially spaced relation relative to the container neck to provide a fluid vent therewith, opening said valve means, introducing pressurized fluid through said head section and into said opposite end of said core pin axially therethrough in one direction and outwardly through said valve means and in an opposite axial direction between said core pin and parison to progressively inflate said parison from said one end to the opposite end thereof while porting said fluid through said vent until the entire interior of the container is lined with parison material, terminating the flow of inflating fluid, and withdrawing said head section annular flange from and said core pin through said container neck.

2. A method of internally lining containers as defined in claim 1, in which said preformed container is housed in and supported by mold structure, and in which after the parison is inflated and before the core pin is withdrawn, the container is positively cooled by circulating a coolant through said mold structure to facilitate setting of said inflated parison.

References Cited in the file of this patent

UNITED STATES PATENTS

| | | |
|---|---|---|
| 2,290,129 | Moreland et al. | July 14, 1942 |
| 2,298,716 | Moreland et al. | Oct. 13, 1942 |
| 2,724,672 | Rubin | Nov. 22, 1955 |
| 2,872,766 | Meissner | Feb. 10, 1959 |
| 2,898,972 | Strong | Aug. 11, 1959 |
| 2,944,298 | Bernhardt et al. | July 12, 1960 |
| 2,959,812 | Allen | Nov. 15, 1960 |

FOREIGN PATENTS

| | | |
|---|---|---|
| 453,123 | Great Britain | Sept. 1, 1936 |